US010404029B2

(12) United States Patent
Miura

(10) Patent No.: US 10,404,029 B2
(45) Date of Patent: Sep. 3, 2019

(54) LIGHT SOURCE APPARATUS SHAPING A WAVEFORM OF A PUMP LIGHT SOURCE AND USING OPTICAL PARAMETRIC PROCESS WITH INFORMATION ACQUISITION APPARATUS USING SAME

(71) Applicant: CANON KABUSHIKI KAISHA, Tokyo (JP)

(72) Inventor: Shun Miura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 15/370,940

(22) Filed: Dec. 6, 2016

(65) Prior Publication Data

US 2017/0170621 A1 Jun. 15, 2017

(30) Foreign Application Priority Data

Dec. 10, 2015 (JP) ................................ 2015-240843

(51) Int. Cl.
*H01S 3/067* (2006.01)
*H01S 3/094* (2006.01)
(Continued)

(52) U.S. Cl.
CPC ............ *H01S 3/06708* (2013.01); *G02F 1/35* (2013.01); *H01S 3/0057* (2013.01);
(Continued)

(58) Field of Classification Search
CPC .. H01S 3/06708; H01S 3/0057; H01S 3/0675; H01S 3/094076; H01S 3/23;
(Continued)

(56) References Cited

U.S. PATENT DOCUMENTS 5,923,683 A * 7/1999 Morioka ............... G02F 1/3515 359/330
6,532,091 B1 * 3/2003 Miyazaki ............. H04B 10/299 359/237
(Continued)

OTHER PUBLICATIONS

Erin S. Lamb, Simon LeFrancois, Minbiao Ji, William J. Wadsworth, X. Sunney Xie, Frank W. Wise, Fiber Optical Parametric Oscillator for Coherent Anti-Stokes Raman Scattering Microscopy, Optics Letters, Oct. 15, 2013, 38(20):4154-4157, Optical Society of America, Washington DC, 2013.
(Continued)

*Primary Examiner* — Que Tan Le
*Assistant Examiner* — Jennifer D Bennett
(74) *Attorney, Agent, or Firm* — Canon U.S.A., Inc. IP Division

(57) ABSTRACT

An introduction unit that introduces a pump light pulse having a first wavelength, a shaping unit that shapes a waveform of the pump light pulse, a nonlinear optical waveguide that generates a wavelength converted light pulse from a pump light pulse, the pump light pulse being a pulse that has been shaped in the shaping unit, through an optical parametric process, the wavelength converted light pulse including a second wavelength different from the first wavelength. The shaping unit shapes the waveform of the pump light pulse such that an absolute value of a time rate of change of the waveform at a peak area of the pump light pulse that has been shaped is smaller than an absolute value of a time rate of change of the waveform at a peak area of the pump light pulse before being shaped with the shaping unit.

19 Claims, 8 Drawing Sheets

(51) Int. Cl.

| | |
|---|---|
| ***H01S 3/108*** | (2006.01) |
| ***H01S 3/13*** | (2006.01) |
| ***H01S 3/23*** | (2006.01) |
| ***G02F 1/35*** | (2006.01) |
| ***H01S 3/00*** | (2006.01) |
| ***H01S 3/16*** | (2006.01) |

(52) U.S. Cl.
CPC ...... *H01S 3/0675* (2013.01); *H01S 3/094076* (2013.01); *H01S 3/1083* (2013.01); *H01S 3/1305* (2013.01); *H01S 3/23* (2013.01); *H01S 3/0092* (2013.01); *H01S 3/06754* (2013.01); *H01S 3/1618* (2013.01); *H01S 2301/08* (2013.01)

(58) Field of Classification Search
CPC .... H01S 3/1083; H01S 3/1305; H01S 3/0092; H01S 3/06754; H01S 3/1618; H01S 2301/08; G02F 1/35
See application file for complete search history.

(56) References Cited

U.S. PATENT DOCUMENTS

2002/0009115 A1* 1/2002 Sumiyoshi ................ G02F 1/39 372/75
2006/0002715 A1* 1/2006 Igarashi ................ G02F 1/3513 398/152
2010/0202477 A1* 8/2010 Yanagisawa ............ H01S 3/109 372/22
2011/0049337 A1* 3/2011 Taira ......................... G01J 9/04 250/216
2011/0273763 A1* 11/2011 Kaertner ................... G02F 1/39 359/330

OTHER PUBLICATIONS

Changjian Guo, Michael Nix, Scott S.-H. Yam, Sailing, He, Picosecond and Sub-Picosecond Flat-Top Pulse Shaping Using Abrupt Taper Interferometers, Journal of Lightwave Technology, Mar. 15, 2010, 28(6):876-881, IEEE, Piscataway NJ, 2010.

* cited by examiner

LIGHT SOURCE APPARATUS SHAPING A WAVEFORM OF A PUMP LIGHT SOURCE AND USING OPTICAL PARAMETRIC PROCESS WITH INFORMATION ACQUISITION APPARATUS USING SAME

BACKGROUND

Field of Art

The present disclosure relates to a light source apparatus and an information acquisition apparatus using the same, and, in particular, relates to wavelength conversion and an amplification technique, which uses an optical parametric process.

Description of the Related Art

In molecular imaging of recent years, a technique for performing observations using short pulsed light as excitation light is being developed. In particular, research for performing imaging of selected molecular species by detecting the intensity of fluorescence caused by two-photon absorption or the intensity of stimulated Raman scattering have been studied actively. In performing such imaging, a light pulse that has a wavelength that matches the observation object is used as the excited light.

Light pulses with various wavelengths can be generated by utilizing wavelength conversion and amplification of light pulses through a nonlinear effect that occurs when the light pulse propagates inside a nonlinear optical waveguide. For example, Optics Letters, Vol. 38, No. 20, pp. 4154-4157, Oct. 15, 2013 (Non-Patent Literature 1) reported a method using an optical parametric process during four-wave mixing inside a nonlinear optical waveguide as a method of achieving wavelength conversion to a light pulse having a narrow linewidth and a high output.

In wavelength conversion through four-wave mixing, two wavelength converted light pulses, namely, an idler beam that is a light pulse having a wavelength that is longer than that of the pump light pulse, and a signal beam that is a light pulse having a wavelength that is shorter than that of the pump light pulse are generated at the same time, and either one of the wavelength converted light pulses is extracted as an output pulse. In so doing, by synchronizing and inputting either one of the wavelength converted lights, that is, the idler beam and the signal beam, with the pump light pulse as a seed beam, energy conversion efficiency can be increased. That is referred to as a fiber optical parametric amplification (FOPA).

SUMMARY

In molecular imaging using a nonlinear optical process, signal intensity can be increased by increasing the peak intensity of a light pulse used as a light source. In order to do so, it is useful to shorten the pulse width (full width at half maximum) of the wavelength converted light to about 10 ps (picoseconds) or less. Furthermore, when the pulse width of the wavelength converted light is short with respect to the pulse width of the pump light pulse, the wavelength conversion efficiency in the optical parametric process decreases; accordingly, it is desirable that the pulse width of the pump light pulse is also shortened to a similar extent.

However, when the pulse width of the pump light pulse is shortened, the cross phase modulation (XPM) in the nonlinear optical waveguide increases, disadvantageously causing a distortion in the spectrum shape of the wavelength converted light pulse. As a result, the spectrum shape of the light pulse used as the light source becomes distorted and the resolution in performing molecular imaging becomes degraded.

A light source apparatus according to the present disclosure includes an introduction unit that introduces a pump light pulse having a first wavelength, a shaping unit that shapes a waveform of the pump light pulse, and a nonlinear optical waveguide that generates a wavelength converted light pulse from a pump light pulse through an optical parametric process, wherein the pump light pulse being a pulse that has been shaped in the shaping unit, the wavelength converted light pulse including a second wavelength different from the first wavelength. The shaping unit shapes the waveform of the pump light pulse such that an absolute value of a time rate of change of the waveform at a peak area of the pump light pulse that has been shaped is smaller than an absolute value of a time rate of change of the waveform at a peak area of the pump light pulse before being shaped with the shaping unit.

Further features of the present invention will become apparent from the following description of exemplary embodiments with reference to the attached drawings.

DESCRIPTION OF THE EMBODIMENTS

Figure 1:
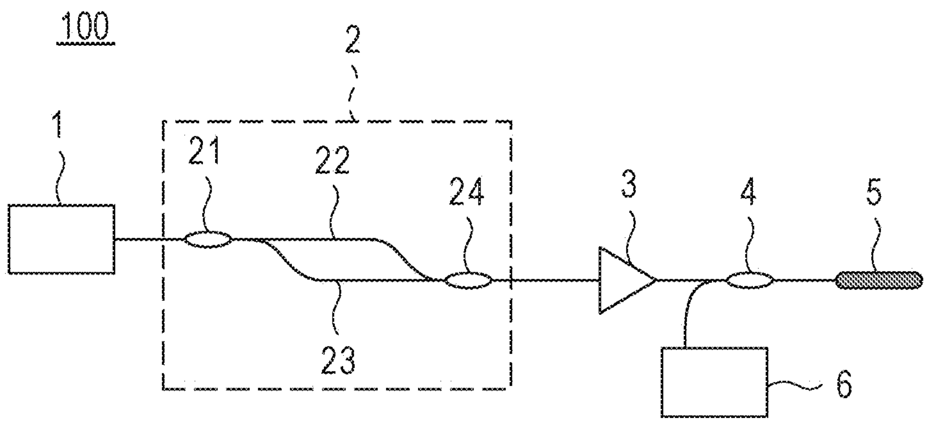
FIG. 1 is a diagram illustrating a schematic configuration of a light source apparatus according to a first exemplary embodiment of the present disclosure.

Hereinafter, exemplary embodiments of the present disclosure will be described with reference to the drawings. Note that the present disclosure is not limited to the following exemplary embodiments and can be modified as appropriate without departing from the thought and scope of the disclosure. Furthermore, in the following drawings, components that have the same function will be denoted with the same reference numeral and description thereof may be omitted or may be given in a concise manner.

First Exemplary Embodiment

A light source apparatus according to a first exemplary embodiment of the present disclosure will be described with reference to FIGS. 1 to 5B. FIG. 1 is a diagram illustrating a schematic configuration of a light source apparatus 100 according to the first exemplary embodiment of the present disclosure. The light source apparatus 100 includes a pump light introduction unit 1, an optical waveform shaping unit 2, a light amplification unit 3, a combiner 4, a nonlinear optical waveguide 5, and a seed beam introduction unit 6. Note that the optical waveform shaping unit 2 includes a divider 21, waveguide units 22 and 23, and a combiner 24.

The pump light introduction unit 1 is formed of a single-mode fiber, and the like and introduces a pump light pulse from a pump light source (not shown) to the optical waveform shaping unit 2. For example, a laser diode pumped mode locked pulse laser that uses Yb-doped fiber as a gain medium may be used as the pump light source. The outcome from the pump light introduction unit 1 may contain some noise pulses, but the peak intensity of the noise pulses are less than 1% of that of the pump pulse and thus those noise pulses do not result in any otiose generation of pulses in the four-wave mixing process. In the present exemplary embodiment, the pump light introduction unit 1 introduces a light pulse having a wavelength of 1035 nm, a pulse energy of 0.1 nJ, repetition rate of 40 MHz, and a pulse width of 4.1 ps. The pump light pulse is introduced to the optical waveform shaping unit 2 with a single-mode optical fiber, for example. Alternatively, when the pump light pulse is propagating through a spatial system, coupling to the optical waveform shaping unit 2 may be performed with a lens. Furthermore, by introducing the pump light pulse directly to the optical waveform shaping unit 2 from the spatial system by using an optical system, such as a mirror, a nonlinear process created when an optical fiber is used in the pump light introduction unit 1 can be reduced. In such a case, the optical system, such as a mirror, serves as the pump light introduction unit 1.

The optical waveform shaping unit 2 shapes the waveform of the pump light pulse introduced from the pump light introduction unit 1 into a flat top shape illustrated in FIG. 2C described later. The optical waveform shaping unit 2 of the present exemplary embodiment first divides the pump light pulse introduced from the pump light introduction unit 1 into two beams of divided light with the divider 21, such as an optical coupler. Subsequently, by guiding the beams of divided light, which have been divided, each through the corresponding one of the waveguide units 22 and 23, such as optical fibers, that have different optical path lengths, a phase difference is provided between the beams of divided light. Furthermore, the two beams of divided light having different phases are combined with each other again with the combiner 24, such as an optical coupler. In so doing, the difference in the optical path lengths of the waveguide units 22 and 23 are adjusted so that the peak positions of the two beams of divided light that are combined are offset by about 5 ps and so that the two beams of divided light are combined while interfering with each other in the most constructive manner. Note that in order to fine adjust the difference in the optical path lengths and to dynamically adjust the difference in the optical path lengths according to the change in the experiment environment, a mechanism that slightly adjusts the difference in the optical path lengths by applying external force to either of the waveguide units 22 and 23 may be included. With the above, the pump light pulse can be shaped into a double hump shape, which is similar to the flat top shape, illustrated in FIG. 5A described later.

The light amplification unit 3 amplifies the pump light pulse that has been shaped in the optical waveform shaping unit 2. For example, an Yb-doped fiber that has been pumped with optical output of laser diode may be used as the light amplification unit 3. The pump light pulse is amplified to 10 nJ with the light amplification unit 3 while maintaining the double hump shape. Note that in a case in which the power of the pump light pulse output from the optical waveform shaping unit 2 is sufficient, the light amplification unit 3 may be omitted.

The seed beam introduction unit 6 is formed of a single-mode fiber, and the like and introduces a seed beam pulse from a seed beam source to the nonlinear optical waveguide 5 through the combiner 4. In the present exemplary embodiment, a light pulse having a central wavelength of 823 nm, a spectral width of 0.5 nm, and a pulse energy of 0.1 nJ is introduced as the seed beam of the wavelength converted light pulse. The combiner 4 combines the pump light pulse amplified in the light amplification unit 3 and the seed beam of the wavelength converted light pulse introduced from the seed beam introduction unit 6. For example, a wavelength division multiplexer (WDM) connected to an optical fiber may be used as the combiner 4. In a case in which the seed beam of the wavelength converted light pulse is introduced by propagating through a spatial system, a dichroic mirror may be used as the combiner 4.

The nonlinear optical waveguide 5 generates a wavelength converted light pulse through an optical parametric process. For example, an optical fiber having a high nonlinear coefficient may be used as the nonlinear optical waveguide 5. In the present exemplary embodiment, a photonic crystal fiber having a zero-dispersion wavelength of 1054 nm, a secondary distribution constant of $1.64\times10^{-3}$ $ps^2/m$, a tertiary distribution constant of $6.55\times10^{-5}$ $ps^3/m$, a quaternary distribution constant of $-9.40\times10^{-8}$ $ps^4/m$, and a length of 30 cm is used.

Figures 2A, 2B, 2C:
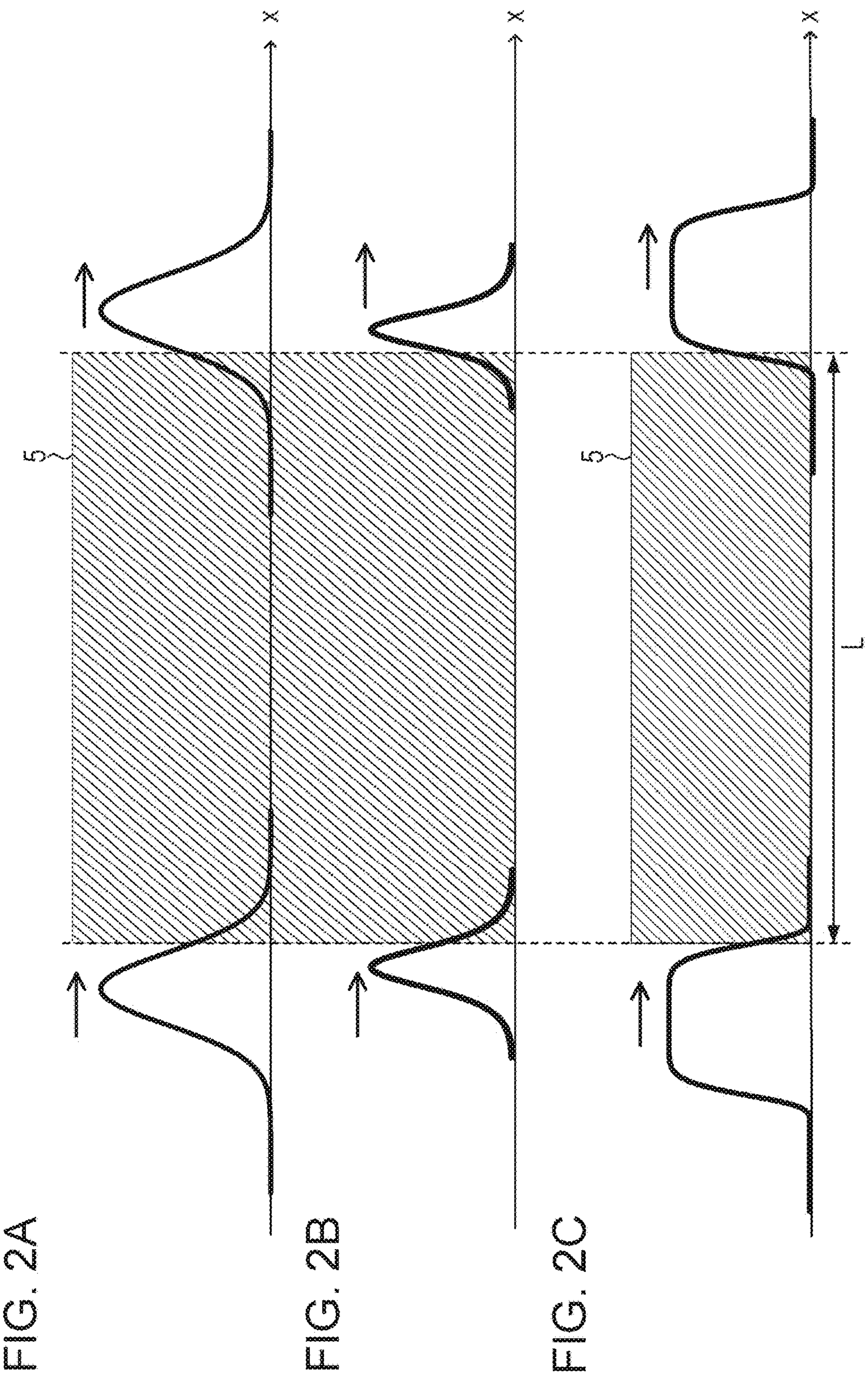
FIGS. 2A to 2C are schematic diagrams illustrating a state in which a pump light pulse and a wavelength converted light pulse propagate through a nonlinear optical waveguide.

FIGS. 2A to 2C are schematic diagrams illustrating a state in which the pump light pulse and the wavelength converted light pulse propagate through the nonlinear optical waveguide 5. FIG. 2A illustrates the pump light pulse at the light input and the light output of the nonlinear optical waveguide 5, FIG. 2B illustrates the wavelength converted light pulse at the light input end and the light output end of the nonlinear optical waveguide 5, and FIG. 2C illustrates the pump light pulse that has been shaped by the optical waveform shaping unit 2. The optical waveform shaping unit 2 of the present exemplary embodiment shapes the waveform of the pump light pulse illustrated in FIG. 2A into the flat top shape illustrated in FIG. 2C.

As described above, in molecular imaging that uses FOPA or the like, it is useful to shorten the pulse width (full width at half maximum) of the wavelength converted light to about 10 ps (picoseconds) or less in order to increase the peak intensity of the light pulse used as the light source. Furthermore, it is desirable to also shorten the pulse width of the pump light pulse to about the same degree in order to perform wavelength conversion or amplification of the light pulse in a highly efficient manner.

However, when propagating through the nonlinear optical waveguide 5, the wavelength converted light pulse experiences an XPM in proportion to a time change of the intensity P(t) of the pump light pulse. In such a case, a frequency change amount $\delta\omega_r(t)$ occurring in the wavelength converted light pulse is expressed by the following expression (1).

$$\delta\omega_r(t) \propto -dP(t)/dt \quad (1)$$

Figure 3B:
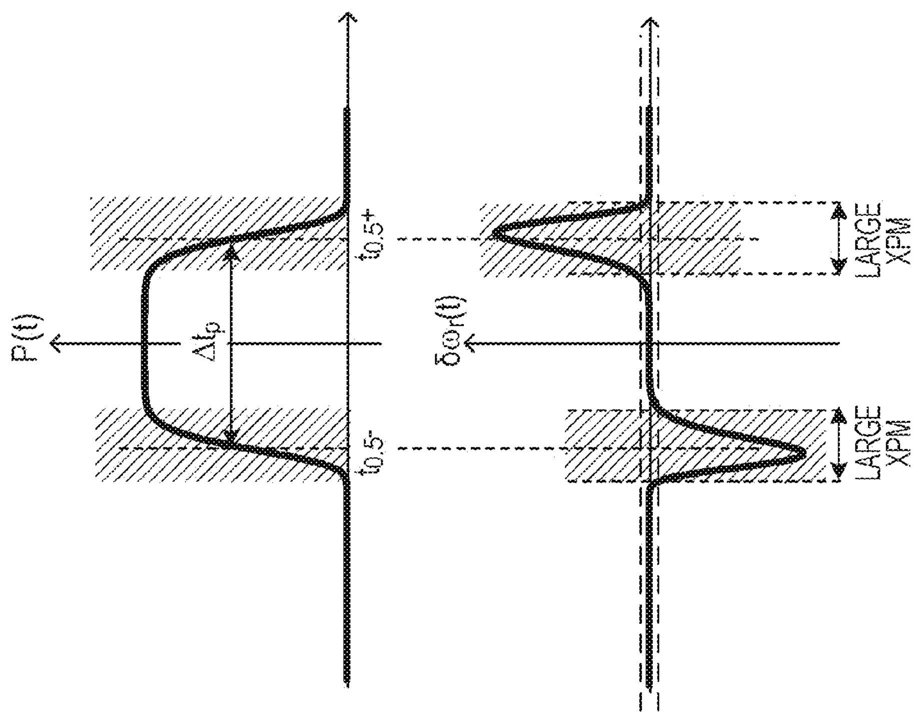
FIGS. 3A and 3B are schematic diagrams illustrating relationships between shapes of the pump light pulse and sizes of a cross phase modulation (XPM).
Figure 3A:
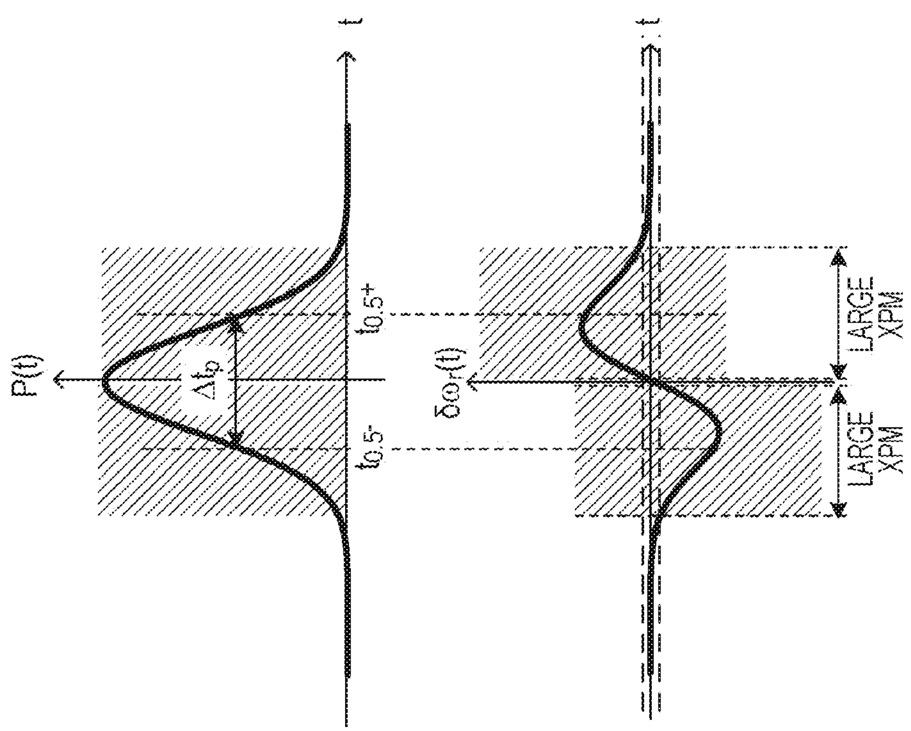

FIGS. 3A and 3B are schematic diagrams illustrating relationships between the shapes of the pump light pulse and the sizes of the cross phase modulation (XPM). FIG. 3A illustrates an example of a pump light pulse having a sech shape. Meanwhile, FIG. 3B illustrates an example of the pump light pulse having a flat top shape that has been shaped by the optical waveform shaping unit 2 of the present exemplary embodiment.

As illustrated in FIGS. 3A and 3B, the frequency change amount $\delta\omega_r(t)$ of the wavelength converted light pulse given by the above equation (1) takes a negative value in the first half portion ($t<0$) of the pump light pulse and takes a positive value in the second half portion ($t>0$). Furthermore, the absolute value of the frequency change amount $\delta\omega_r(t)$ is at its maximum near a half maximum point $t_{0.5}$ in which the intensity $P(t)$ of the pump light pulse is half of the peak value. FIGS. 3A and 3B each illustrate a half maximum point $t_{0.5}^-$ at the rise of the pulse in the first half portion of the light pulse and a half maximum point $t_{0.5}^+$ at the fall of the pulse in the second half portion of the light pulse.

Note that since the wavelength converted light pulse stretches through time, the frequency change amount $\delta\omega_r(t)$ in the wavelength converted light pulse at each clock time is not uniform. As a result, distortion and scattering occurs in the spectrum of the wavelength converted light pulse. The effect of the above becomes prominent when the pulse width of the pump light pulse becomes about 10 ps or less. FIGS. 3A and 3B illustrate the areas where the XPM becomes large with slanted lines. When the wavelength converted light pulse overlaps the slanted areas, the spectrum of the wavelength converted light pulse becomes distorted.

Accordingly, the optical waveform shaping unit 2 shapes the waveform of the pump light pulse so that the distortion in the shape of the spectrum caused by the XPM is reduced. Specifically, as illustrated in FIG. 3B, the optical waveform shaping unit 2 shapes the waveform of the pump light pulse so that the time change at a portion in the vicinity of the peak is, compared with the sech shape, the Gaussian shape, and the like, moderate, and so that the shape thereof is a light tailed flat top shape or is a similar shape. In the present exemplary embodiment, the waveform as above that has been shaped by the optical waveform shaping unit 2 is referred to as a "flat top shape". Note that the flat top shape is not limited to the waveform illustrated in FIG. 3B. It is only sufficient that the time change of the waveform at the peak of the pump light pulse is small in the flat top shape during the period in which the waveform of the wavelength converted light pulse and the waveform of the pump light pulse overlap each other. More specifically, the flat top shape is defined in the following manner.

First exemplary definition: in the flat top shape, the absolute value of the time rate of change of the waveform at the peak area is smaller than the absolute value of the time rate of change of the waveform at the peak area of the pump light pulse before the shaping. Here, the peak area of the pulse is defined as the temporal area which has the range of $\Delta t_r + t_{wo}$ and centers at $(t_{0.5}^+ + t_{0.5}^+)/2$, or as the temporal area in which the pump light pulse overlaps with the wavelength converted light pulse in the nonlinear optical waveguide. Furthermore, the absolute value of the time rate of change of the waveform at the half maximum point is larger than the absolute value of the time rate of change of the waveform at the half maximum point of the pump light pulse before the shaping.

Second exemplary definition: Assume that the waveform of the pump light pulse is similarly transformed so that the full width at half maximum of the pump light pulse before shaping and that after shaping coincide with each other. In such a case, in the flat top shape, the absolute value of the time rate of change of the waveform at and/or near the peak is smaller than the absolute value of the time rate of change of the waveform at and/or near the peak of the pump light pulse before the shaping.

With the above, the distortion in the spectrum shape of the wavelength converted light pulse caused by the XPM can be reduced. Furthermore, if the intensity of the pump light pulse after the shaping is smaller than the intensity of the pump light pulse before the shaping in the period in which the waveform of the wavelength converted light pulse and the waveform of the pump light pulse do not overlap each other, wavelength conversion or the amplification of the light pulse can be performed in a highly efficient manner. A double hump shape or a super Gaussian shape, for example, can be used as the flat top shape described above.

In the pump light pulse having a flat top shape illustrated in FIG. 3B, the slanted area where the effect of the XPM is large is eliminated in the area in the vicinity of the peak. Accordingly, by disposing the wavelength converted light pulse in the vicinity of the peak of the pump light pulse having the flat top shape, the XPM on the wavelength converted light pulse can be suppressed.

Figure 4A:
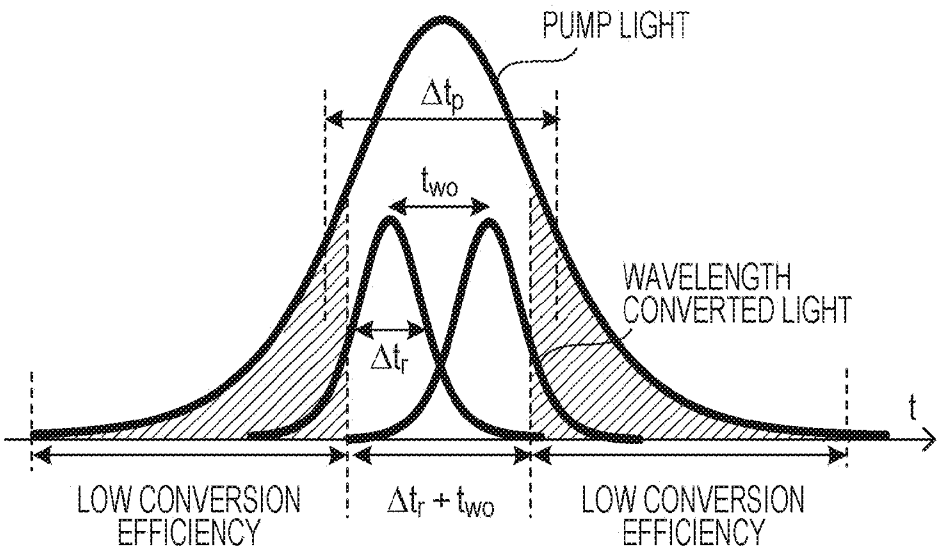
FIGS. 4A and 4B are schematic diagrams illustrating relationships between the shapes of the pump light pulse and wavelength conversion efficiency.
Figure 4B:
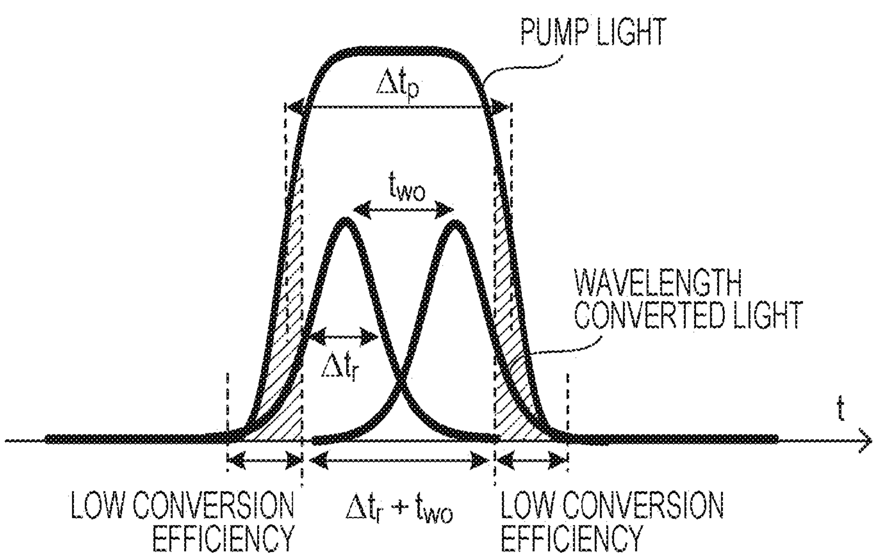

FIGS. 4A and 4B are schematic diagrams illustrating relationships between the shapes of the pump light pulse and the wavelength conversion efficiency. FIG. 4A illustrates the pump light pulse and the wavelength converted light pulse in the nonlinear optical waveguide 5 in a case in which there is no optical waveform shaping unit 2, and FIG. 4B illustrates the pump light pulse and the wavelength converted light pulse in the nonlinear optical waveguide 5 in a case in which there is an optical waveform shaping unit 2. The wavelength converted light pulse illustrated in FIG. 4B is disposed in the vicinity of the peak of the pump light pulse having the flat top shape where the effect of the XPM can be suppressed.

As illustrated in FIGS. 4A and 4B, in the course of propagating through the nonlinear optical waveguide 5, the peak position of the pulse width $\Delta t_r$ of the wavelength converted light pulse is offset with respect to the pump light pulse by (half of) a walk-off time $t_{wo}$. Note that the walk-off time $t_{wo}$ is the difference between the wave-guiding times of the pump light pulse and the wavelength converted light pulse that have entered the nonlinear optical waveguide 5 at the same time, the difference being created by the difference in group velocities between the pump light pulse and the wavelength converted light pulse in the nonlinear optical waveguide 5. The walk-off time $t_{wo}$ is expressed by the following equation (2), where L is the length of the nonlinear optical waveguide 5, $n_p$ is a group index of the nonlinear optical waveguide 5 with respect to the pump light pulse, $n_r$ is a group index of the nonlinear optical waveguide 5 with respect to the wavelength converted light pulse, and c is the light velocity in vacuum.

$$t_{wo} = L|n_r - n_p|/c \quad (2)$$

While the above equation (2) expresses a walk-off amount in the nonlinear optical waveguide 5, XPM is generated in the optical waveguide between the combiner 4 and the nonlinear optical waveguide 5, and between the nonlinear optical waveguide 5 and an output terminal. Furthermore, according to the shape and material of the optical waveguide or the intensity of the pumped pulse light, the XPM changes the shape of the wavelength converted light pulse. In such a case, the walk-off time $t_{wo}$ in which the lengths and the indexes of the optical waveguide and the like are introduced into the above equation (2) is calculated.

In FIGS. 4A and 4B, the period in which the waveform of the wavelength converted light pulse overlaps the waveform of the pump light pulse is $\Delta t_r + t_{wo}$ that is the sum of the pulse width $\Delta t_r$ of the wavelength converted light pulse and the walk-off time $t_{wo}$. The optical waveform shaping unit 2 shapes the waveform of the pump light pulse into the flat top shape so that the following expression (3) is satisfied.

$$\Delta t_r + t_{wo} \leq \Delta t_p \tag{3}$$

With the above, as illustrated in FIG. 4B, since the wavelength converted light pulse is disposed in the vicinity of the peak of the flat top shape of the pump light pulse, the effect of the XPM on the wavelength converted light pulse can be suppressed.

Furthermore, the optical waveform shaping unit 2 shapes the waveform of the pump light pulse so that the following expression (4) is satisfied during the period of $\Delta t_r + t_{wo}$, where P(t) is the intensity of the pump light pulse, L is a length of the nonlinear optical waveguide 5, and γ is a nonlinear coefficient of the nonlinear optical waveguide 5.

$$|dP(t)/dt| \leq 1 \text{ THz}/\gamma L \tag{4}$$

With the above, the frequency change amount $\delta\omega_r(t)$ of the wavelength converted light pulse with the XPM can be suppressed to 1 THz or less, that is a spectrum width obtained for the purpose of spectroscopic application. For example, the frequency change amount $\delta\omega_r(t)$ in a case in which a wavelength converted light pulse of 823 nm is used corresponds to a frequency change amount of 0.7 nm, which is about the same as 1 nm that is a spectral width obtained in a case in which the wavelength converted light pulse is used for the purpose of spectroscopic application.

FIGS. 4A and 4B illustrate, in slashed lines, the periods in which the pump light pulse and the wavelength converted light pulse do not overlap each other and in which the wavelength conversion efficiency is low. Furthermore, in order to reduce the tail of the waveform of the pump light pulse in which such wavelength conversion efficiency becomes low, the optical waveform shaping unit 2 suppresses the intensity of the pump light pulse during the period in which the wavelength converted light pulse and the waveform do not overlap each other. In so doing, the optical waveform shaping unit 2 shapes the waveform of the pump light pulse so that not only the expression (3) but also the following expression (5) is satisfied. Specifically, the pulse width $\Delta t_p$ (full width at half maximum) of the pump light pulse having a flat top shape is set so as to be 1 time or more to 2 times or less than $\Delta t_r + t_{wo}$ that is the sum of the walk-off time $t_{wo}$ and the pulse width $\Delta t_r$ (full width at half maximum) of the wavelength converted light pulse.

$$\Delta t_r + t_{wo} \leq \Delta t_p \leq 2(\Delta t_r + t_{wo}) \tag{5}$$

With the above, the pump light pulse components that do not satisfy the above expression (4) can be reduced in the period of $\Delta t_r + t_{wo}$ that is the waveform center of the pump light pulse so that the wavelength conversion efficiency can be improved. As a result, a pump light pulse that satisfies the following expression (6) can be obtained, where when the entire energy of the pump light pulse is $I_p$, the pump light pulse energy in the area satisfying expression (5) is $I_p'$.

$$I_p'/I_p \geq 0.5 \tag{6}$$

In other words, ½ or more of the energy of the pump light pulse can be used in the wavelength conversion. As described above, while reducing the tails indicated in FIG. 4A by slanted lines where the wavelength conversion efficiency is low and while improving the efficiency of energy conversion from the pump light pulse to the wavelength converted light pulse, the pulse width of the wavelength converted light pulse can be kept short.

Figure 5B:
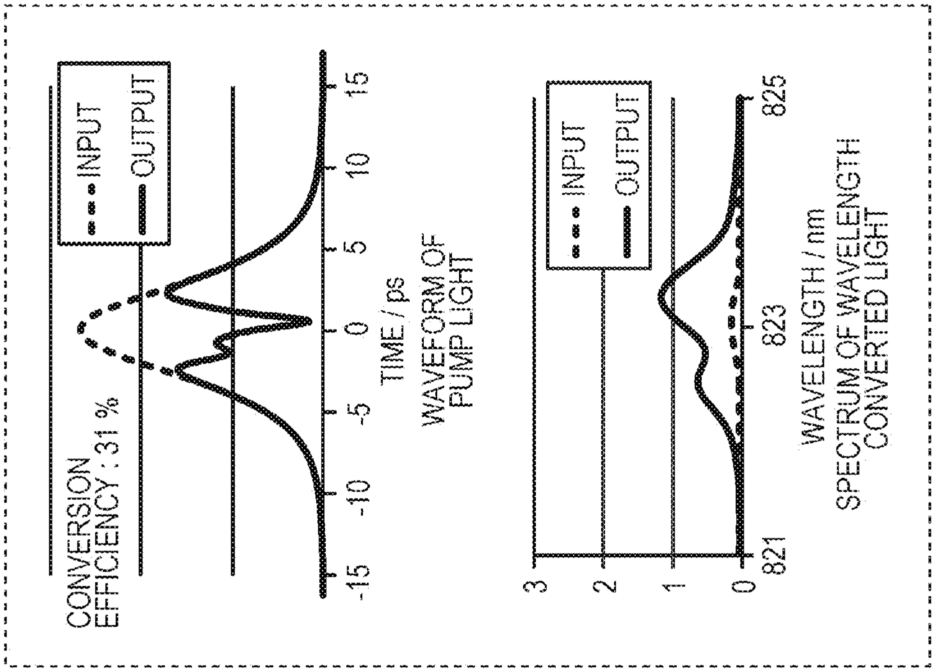
FIGS. 5A and 5B illustrate simulation results indicating that XPM is suppressed and the wavelength conversion efficiency is improved with an optical waveform shaping unit of the light source apparatus according to the first exemplary embodiment of the present disclosure.
Figure 5A:
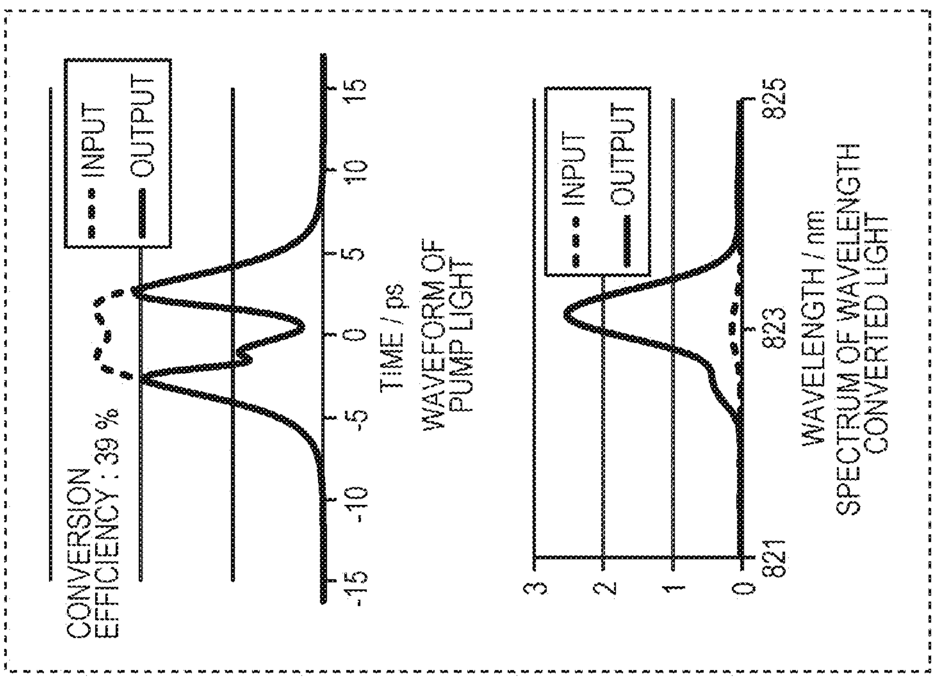

FIGS. 5A and 5B illustrate simulation results indicating that XPM is suppressed and the wavelength conversion efficiency is improved with the optical waveform shaping unit 2 of the light source apparatus according to the first exemplary embodiment of the present disclosure. FIG. 5A illustrates a simulation result of the pump light pulse waveform at the light input end (input) and the light output end (output) of the nonlinear optical waveguide 5, in a case in which there is an optical waveform shaping unit 2. Meanwhile, FIG. 5B illustrates a simulation result of a case in which there is no optical waveform shaping unit 2. As illustrated by solid lines in FIGS. 5A and 5B, it can be understood that distortion of the spectrum shape of the wavelength converted light at the light output end of the nonlinear optical waveguide 5 was smaller in FIG. 5A having the optical waveform shaping unit 2 than that in FIG. 5B having no optical waveform shaping unit 2. Furthermore, in a similar manner, the conversion efficiency was improved more in the case in FIG. 5A having the optical waveform shaping unit 2. As described above, by forming the waveform of the pump light pulse into a double hump shape that is similar to the flat top shape, distortion of the spectrum of the wavelength converted light pulse caused by XPM can be reduced. In addition, the conversion efficiency from the pump light pulse to the wavelength converted light pulse of the signal beam or the idler beam can be improved.

As described above, the present exemplary embodiment includes a pump light shaping unit that shapes the waveform of the pump light pulse in the nonlinear optical waveguide into a flat top shape. Furthermore, the nonlinear optical waveguide amplifies the wavelength converted light pulse by inducing energy conversion from the shaped pump light pulse to the wavelength converted light pulse. With the above, the light pulse can be amplified highly efficiently with little distortion in the spectrum shape.

Furthermore, in the present exemplary embodiment, the optical waveform shaping unit includes the combiner, the divider, and the plurality of waveguide units that have different optical path lengths that guide each of the beams of divided light that has been divided. With the above, the waveform of the pump light pulse can be shaped into a double hump shape, which is similar to the flat top shape.

Note that although in FIG. 1, a configuration of the optical waveform shaping unit 2 in which the pump light pulse is divided into two beams of divided light has been illustrated, the configuration is not limited to such a configuration. For example, by dividing the pump light pulse into a plurality of, namely, three or more beams of divided light, and combining the three or more beams of divided light after the phase differences thereof have been adjusted, the waveform of the pump light pulse can be shaped into a waveform that is closer to the flat top shape. Furthermore, as described later, the optical waveform shaping unit 2 can be a combination of a plurality of optical couplers, can be an optical waveform shaping unit including a diffractive grating and a spatial light phase modulator, or can be configured using an optical fiber or the like on which a fiber Bragg grating or a taper process has been performed.

Second Exemplary Embodiment

Figure 6:
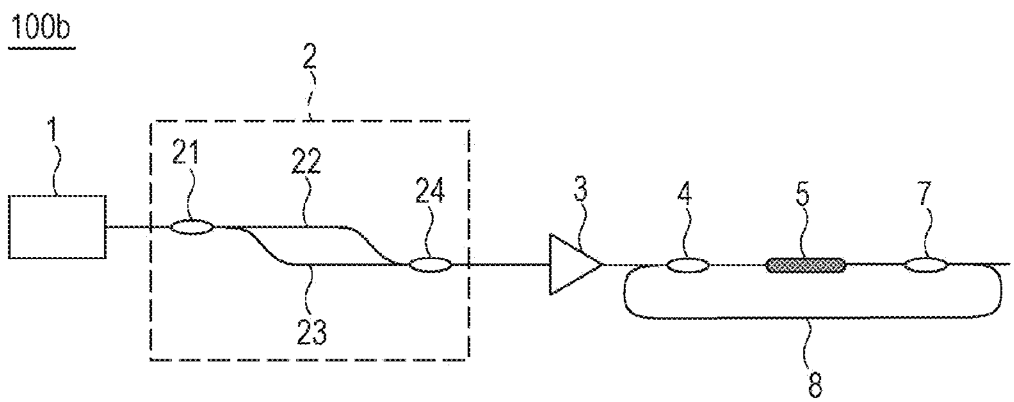
FIG. 6 is a diagram illustrating a schematic configuration of a light source apparatus according to a second exemplary embodiment of the present disclosure.

A light source apparatus according to a second exemplary embodiment of the present disclosure will be described with reference to FIG. 6. FIG. 6 is a diagram illustrating a schematic configuration of a light source apparatus 100*b* according to the second exemplary embodiment of the present disclosure. The light source apparatus 100*b* includes a pump light introduction unit 1, an optical waveform shaping unit 2, a light amplification unit 3, a combiner 4, a nonlinear optical waveguide 5, an extracting unit 7, and a feedback unit 8. Since the pump light introduction unit 1, the optical waveform shaping unit 2, the light amplification unit 3, the combiner 4, and the nonlinear optical waveguide 5 are similar to those in the first exemplary embodiment, description thereof will be omitted. Compared with the first exemplary embodiment, the light source apparatus 100*b* of the present exemplary embodiment is not provided with the seed beam introduction unit 6. In other words, in the present exemplary embodiment, the seed beam of the wavelength converted light pulse is not introduced. Alternatively, in the present exemplary embodiment, 90% of the output of the nonlinear optical waveguide 5 is extracted and output externally with the extraction unit 7, and the remaining 10% is fed back to the combiner 4 with the feedback unit 8. With the above, an optical resonator for optical wavelength conversion is included in the present exemplary embodiment.

Note that while in the above equation (2) expresses the walk-off amount in the nonlinear optical waveguide 5, XPM is generated in the optical waveguide between the combiner 4 and the nonlinear optical waveguide 5, between the nonlinear optical waveguide 5 and the extracting unit 7, and between the extracting unit 7 and the output terminal. In such a case, the walk-off time $t_{wo}$ is calculated using a similar method of calculation in the above equation (2) according to the shape and material of the optical waveguide or the intensity of the pumped pulse light.

In the present exemplary embodiment, an optical coupler connected to a fiber is used as the extracting unit 7. Furthermore, a single-mode fiber is used as the feedback unit 8. It is only sufficient that the feedback unit 8 is a waveguide that guides the wavelength converted light pulse, and the feedback unit 8 may be configured as a spatial system using a mirror. The combiner 4 performs timing synchronization and combines the wavelength converted light pulse fed back from the feedback unit 8, and the pump light pulse output from the light amplification unit 3. The combined pump light pulse and wavelength converted light pulse propagate through the nonlinear optical waveguide 5 again and a wavelength converted light pulse caused by quantum noise is amplified and is output from the extracting unit 7. The central wavelength of the wavelength converted light pulse is determined by a phase matching condition that is set by the wavelength and intensity of the pump light pulse and a dispersion parameter of the nonlinear optical waveguide 5, and is 823 nm in the present exemplary embodiment. Note that a delay line for synchronizing the timing may be inserted in the feedback unit 8. Furthermore, a wavelength filter may be inserted to the feedback unit 8 for adjusting the spectrum linewidth and the central wavelength of the wavelength converted light pulse to be output.

As described above, the present exemplary embodiment includes a pump light shaping unit that shapes the waveform of the pump light pulse in the nonlinear optical waveguide into a flat top shape. Furthermore, the nonlinear optical waveguide performs wavelength conversion of the shaped pump light pulse into a wavelength converted light pulse through an optical parametric process. With the above, wavelength conversion of a light pulse with little distortion in the spectrum shape can be performed in a highly effective manner without using the seed beam of the wavelength converted light pulse.

Third Exemplary Embodiment

Figure 7:
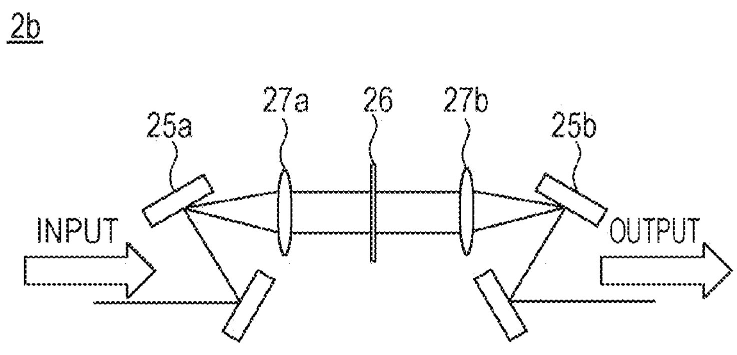
FIG. 7 is a diagram illustrating a schematic configuration of an optical waveform shaping unit of the light source apparatus according to a third exemplary embodiment of the present disclosure.

A wavelength conversion apparatus according to a third exemplary embodiment of the present disclosure will be described. FIG. 7 is a diagram illustrating a schematic configuration of an optical waveform shaping unit 2*b* of the light source apparatus 100 according to the third exemplary embodiment of the present disclosure. The configuration of the light source apparatus 100 of the present exemplary embodiment is similar to the configuration of that of the first exemplary embodiment illustrated in FIG. 1. Compared with the first exemplary embodiment, the present exemplary embodiment is different in that the optical waveform shaping unit 2 includes a spatial light phase modulator (a spatial light modulator). Since the configuration other than the above is the same as the first exemplary embodiment, description thereof is omitted.

In the present exemplary embodiment, as illustrated in FIG. 7, two diffractive gratings 25*a* and 25*b* and a spatial light phase modulator 26 are used as the optical waveform shaping unit 2*b*. The pump light pulse is separated into wavelength components by the diffractive grating 25*a* and is collimated (the light being parallelized) with a lens 27*a*. The wavelength components are each modulated in intensity and phase with the spatial light phase modulator 26. The amount of modulation is externally controlled in an optional manner. A lens 27*b* and the diffractive grating 25*b* are capable of shaping the pump light pulse into an optional shape by forming each of the modulated wavelength components into a single pulse. Note that the configuration of the optical waveform shape unit is not limited to the one in FIG. 7, and the configuration may be changed and the number of optical elements may be reduced by using a reflective spatial light phase modulator or by using a condensing mirror in place of the condensing lens.

As described above, in the present exemplary embodiment, the optical waveform shaping unit includes a spatial light phase modulator. With the above, it is possible to form a pump light pulse that has a waveform that is closer to a rectangle with respect to the waveform of the first exemplary embodiment, and the effect of the XPM can be suppressed further.

Fourth Exemplary Embodiment

Figure 8:
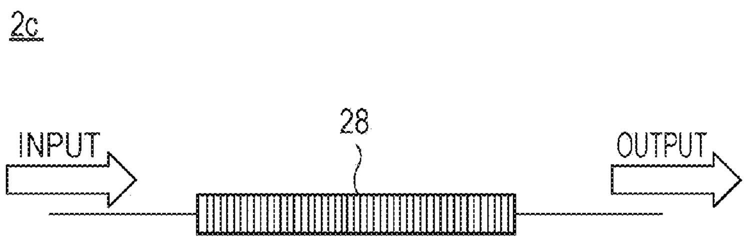
FIG. 8 is a diagram illustrating a schematic configuration of an optical waveform shaping unit of the light source apparatus according to a fourth exemplary embodiment of the present disclosure.

A wavelength conversion apparatus according to a fourth exemplary embodiment of the present disclosure will be described. FIG. 8 is a diagram illustrating a schematic configuration of an optical waveform shaping unit 2*c* of the light source apparatus 100 according to the fourth exemplary embodiment of the present disclosure. The configuration of the light source apparatus 100 of the present exemplary embodiment is similar to the configuration of that of the first exemplary embodiment illustrated in FIG. 1. Compared with the first exemplary embodiment, the present exemplary embodiment is different in that the optical waveform shaping unit 2 includes a fiber Bragg grating. Since the configuration other than the above is the same as the first exemplary embodiment, description thereof is omitted.

In the present exemplary embodiment, an optical waveform shaping unit using a fiber Bragg grating 28 illustrated in FIG. 8 is used as an optical waveform shaping unit 2*c*. The fiber Bragg grating 28 is designed in accordance with the temporal shape and the spectrum shape of the introduced pump light pulse so that the permeating light has a flat top shape.

As described above, in the present exemplary embodiment, the optical waveform shaping unit includes a fiber Bragg grating. With the above, shaping of the temporal waveform of the pump light pulse can be performed without using a spatial system and while being less affected by the change in the external environment compared with the first exemplary embodiment.

Fifth Exemplary Embodiment

Figure 9:
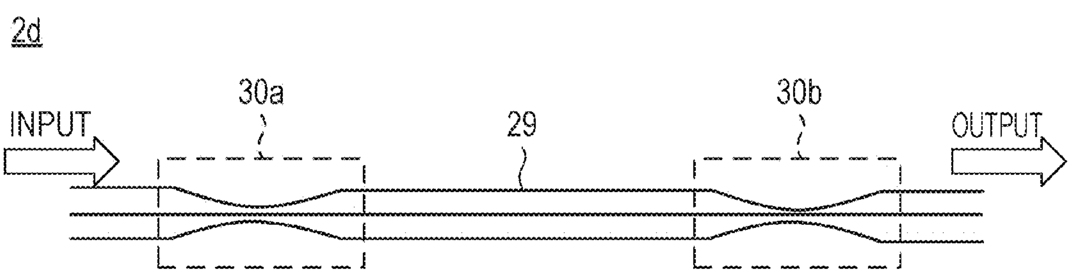
FIG. 9 is a diagram illustrating a schematic configuration of an optical waveform shaping unit of the light source apparatus according to a fifth exemplary embodiment of the present disclosure.

A wavelength conversion apparatus according to a fifth exemplary embodiment of the present disclosure will be described. FIG. 9 is a diagram illustrating a schematic configuration of an optical waveform shaping unit 2*d* of the light source apparatus 100 according to the fifth exemplary embodiment of the present disclosure. The configuration of the light source apparatus 100 of the present exemplary embodiment is similar to the configuration of that of the first exemplary embodiment illustrated in FIG. 1. Compared with the first exemplary embodiment, the present exemplary embodiment is different in that the optical waveform shaping unit 2 includes an optical waveguide that has been processed into a tapered shape. Since the configuration other than the above is the same as the first exemplary embodiment, description thereof is omitted.

In the present exemplary embodiment, an optical waveform shaping unit using an optical fiber 29 processed into a tapered shape illustrated in FIG. 9 is used as an optical waveform shaping unit 2*d*. The pump light pulse propagating through the optical fiber 29 experiences transition to a higher order propagation mode in a first tapered portion 30*a* and returns to a primary propagation mode in a second tapered portion 30*b*. In the above, since the group velocity of the light pulse differs according to the order of the propagation mode, the components that return to the primary propagation mode from a higher order propagation mode in the second tapered portion 30*b* do not experience transition to the higher order propagation mode and is superimposed while having the propagation component and the time delay. As a result, the temporal waveform of the output pulse in the primary propagation mode becomes a double hump shape (for example, see Non-Patent Literature 2 (Journal of Lightwave Technology, Vol. 28, No. 6, pp. 876-881, 15 Mar. 2010)).

As described above, in the present exemplary embodiment, the optical waveform shaping unit includes the optical waveguide having at least two tapered portions that have been processed into a tapered shape. With the above, the waveform of the pump light pulse can be shaped into a double hump shape through an inexpensive processing of the optical fiber and without using a special device, such as the fiber Bragg grating.

Sixth Exemplary Embodiment

Figure 10:
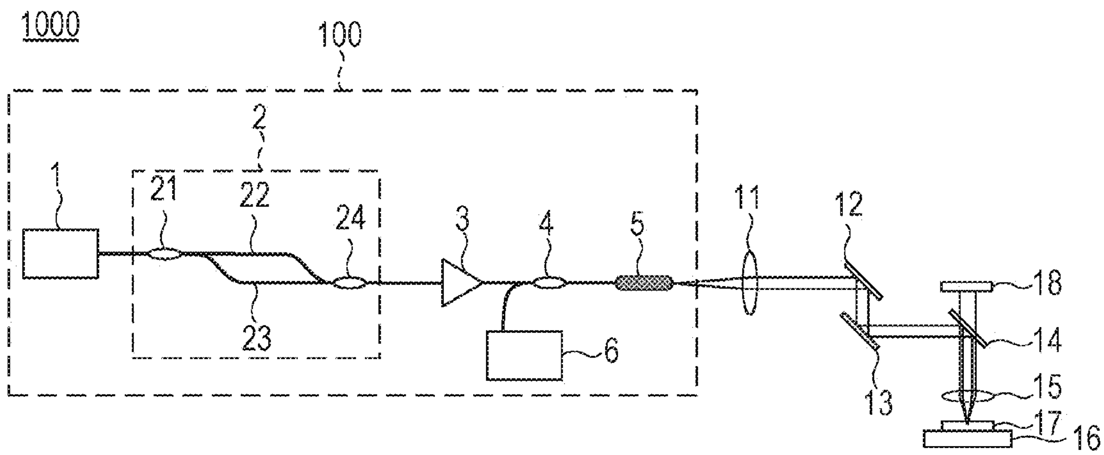
FIG. 10 is a diagram illustrating a schematic configuration of an information acquisition apparatus according to a sixth exemplary embodiment of the present disclosure.

A wavelength conversion apparatus according to a sixth exemplary embodiment of the present disclosure will be described. FIG. 10 is a diagram illustrating a schematic configuration of an information acquisition apparatus 1000 according to the sixth exemplary embodiment of the present disclosure. The information acquisition apparatus 1000 of the present exemplary embodiment includes the light source apparatus of the first to fifth exemplary embodiments and, further, includes a detector 18. Since the light source apparatus 100 of the present exemplary embodiment is similar to that of the first exemplary embodiment illustrated in FIG. 1, description thereof is omitted.

An output of a wavelength converted light pulse having a spectrum shape in which the central wavelength is 823 nm and that has no distortion is obtained with the light source apparatus 100 described in the first to fifth exemplary embodiments. The obtained light pulse passing through a beam collimator 11, an X scan mirror 12, and a Y scan mirror 13 is focused and emitted with a dichroic mirror 14 and an object lens 15 onto a subject 17 fixed to a stage 16. In the subject 17, in the portion where the light pulse has been focused and emitted, a fluorescence caused by two-photon absorption occurs. The fluorescence is taken into the object lens 15, transmits the dichroic mirror 14, and is detected by the detector 18.

In the above, when the X scan mirror 12 is driven and the light focusing point is capable of scanning the inside of the subject 17 in the X direction, and when the Y scan mirror 13 is driven, the light focusing point is capable of scanning the inside of the subject 17 in the Y direction that is orthogonal to the X. Accordingly, by having the light focusing point scan the subject 17 with the X scan mirror 12 and the Y scan mirror 13, a two-dimensional image can be obtained. Furthermore, after completing the first two-dimensional scan, by moving the stage 16 to move the light focusing point by a predetermined distance in an optical-axis direction and by repeating the two-dimensional scanning, a three-dimensional image of the subject 17 can be obtained.

As described above, in the present exemplary embodiment, the output from the light source apparatus of the first to fifth exemplary embodiment is used as the light source. Accordingly, since a light pulse with reduced distortion in the spectrum shape can be used as excited light, a two-photon microscope that is capable of performing imaging with high wavelength resolution can be obtained.

Note that in the present exemplary embodiment, description has been given with a two-photon microscope as an example of the information acquisition apparatus that irradiates the subject with a light pulse, detects at least one of the light that has, on the subject, been reflected, transmitted, or emitted, and acquires information on the subject. However, not limited to the above, the apparatus described in either one of the first to fifth exemplary embodiments can be used in a similar manner to the present exemplary embodiment in information acquisition apparatuses, such as a stimulated Raman scattering microscope and an endoscope.

Other Exemplary Embodiments

Not limited to the exemplary embodiments described above, various modifications can be made to the present disclosure. For example, each configuration described in the exemplary embodiments depicts an example and the wavelength conversion apparatus, the light source apparatus, and the information acquisition apparatus to which the present disclosure can be applied is not limited to the drawings that have been used to describe the above exemplary embodiments. Furthermore, the configurations of the first to sixth exemplary embodiments can be combined and implemented in any manner. The present disclosure can be implemented in various ways without departing from the technical ideas or the main features of the present disclosure.

In the light source apparatus of the present disclosure, a light pulse with little distortion in the spectrum shape can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-240843, filed Dec. 10, 2015, which is hereby incorporated by reference herein in its entirety.

What is claimed is:

1. A light source apparatus, comprising:

an introduction unit that introduces a pump light pulse having a first wavelength;

a shaping unit that shapes a waveform of the pump light pulse having the first wavelength; and a nonlinear optical waveguide that generates a wavelength converted light pulse from the pump light pulse having the first wavelength through an optical parametric process, the pump light pulse being a pulse that has been shaped in the shaping unit, the wavelength converted light pulse including a second wavelength different from the first wavelength, wherein the shaping unit shapes the waveform of the pump light pulse such that an absolute value of a time rate of change of the waveform at a peak area of the pump light pulse that has been shaped is smaller than an absolute value of a time rate of change of the waveform at a peak area of the pump light pulse before being shaped with the shaping unit.

2. The light source apparatus according to claim 1, wherein the shaping unit shapes the waveform of the pump light pulse such that the absolute value of the time rate of change of the waveform at the peak area of the pump light pulse that has been shaped is smaller than the absolute value of the time rate of change of the waveform at the peak area of the pump light pulse before being shaped, and such that an absolute value of a time rate of change of the waveform that has been shaped at half maximum point of the pump light pulse is larger than an absolute value of a time rate of change of the waveform before being shaped at half maximum point of the pump light pulse.

3. The light source apparatus according to claim 1, wherein as the waveform of the pump light pulse becomes similarly transformed so that a full width at half maximum of the pump light pulse before being shaped and a full width at half maximum of the pump light pulse after shaping coincide with each other, the shaping unit shapes the waveform of the pump light pulse such that the absolute value of the time rate of change of the waveform at the peak area of the pump light pulse that has been shaped is smaller than the absolute value of the time rate of change of the waveform at the peak area of the pump light pulse before being shaped.

4. The light source apparatus according to claim 1, wherein in a period in which the waveform of the wavelength converted light pulse and the waveform of the pump light pulse do not overlap each other, the shaping unit shapes the pump light pulse such that an intensity of the pump light pulse that has been shaped is smaller than an intensity of the pump light pulse before being shaped.

5. The light source apparatus according to claim 1, further comprising:

a seed beam introduction unit that introduces a seed beam of the wavelength converted light pulse; and a combiner that combines the seed beam of the wavelength converted light pulse introduced by the seed beam introduction unit and the pump light pulse that has been shaped by the shaping unit, the combiner guiding the seed beam and the pump light pulse that have been combined to the nonlinear optical waveguide, wherein the nonlinear optical waveguide amplifies the wavelength converted light pulse by inducing energy conversion from the pump light pulse that has been shaped to the wavelength converted light pulse.

6. The light source apparatus according to claim 1, further comprising:

a feedback unit that feed backs a portion of the wavelength converted light pulse generated in the nonlinear optical waveguide; and a combiner that combines the wavelength converted light pulse that has been fed back by the feedback unit and the pump light pulse that has been shaped by the shaping unit, the combiner guiding the wavelength converted light pulse and the pump light pulse that have been combined to the nonlinear optical waveguide, wherein the nonlinear optical waveguide performs wavelength conversion of the pump light pulse that has been shaped into the wavelength converted light source through an optical parametric process.

7. The light source apparatus according to claim 1, wherein the pump light pulse satisfies $$\Delta t_r + t_{wo} \leq \Delta t_p,$$

where$\Delta t_p$ is a pulse width of the pump light pulse, $\Delta t_r$ is the pulse width of the wavelength converted light pulse, and $t_{wo}$ is a walk-off time of the wavelength converted light pulse with respect to the pump light pulse in the nonlinear optical waveguide.

8. The light source apparatus according to claim 5, wherein the pump light pulse satisfies $$\Delta t_r + t_{wo} \leq \Delta t_p,$$

where $\Delta t_p$ is a pulse width of the pump light pulse, $\Delta t_r$ is the pulse width of the wavelength converted light pulse, and $t_{wo}$ is a walk-off time of the wavelength converted light pulse with respect to the pump light pulse, between the combiner to an output terminal of the light source apparatus.

9. The light source apparatus according to claim 6, further comprising:

an extracting unit that extracts a portion of an output of the nonlinear optical waveguide and outputs the portion that has been extracted to an outside of the light source apparatus, wherein the pump light pulse satisfies $$\Delta t_r + t_{wo} \leq \Delta t_p,$$

where $\Delta t_p$ is a pulse width of the pump light pulse, $\Delta t_r$ is the pulse width of the wavelength converted light pulse, and $t_{wo}$ is a walk-off time of the wavelength converted light pulse with respect to the pump light pulse, between the combiner to an output terminal of the extracting unit.

10. The light source apparatus according to claim 7, wherein the pump light pulse satisfies $$\Delta t_r + t_{wo} \leq \Delta t_p \leq 2(\Delta t_r + t_{wo})$$

where $\Delta t_p$ is a pulse width of the pump light pulse, $\Delta t_r$ is the pulse width of the wavelength converted light pulse, and $t_{wo}$ is a walk-off time of the wavelength converted light pulse with respect to the pump light pulse, between a combiner to an output terminal of an extracting unit.

11. The light source apparatus according to claim 7, the pump light pulse satisfies $$|dP(t)/dt| \leq 1\ \mathrm{THz}/\gamma L,$$

during a period of $\Delta t_r + t_{wo}$ where P(t) is an intensity of the pump light pulse, L is a length of the nonlinear optical waveguide, and γ is a nonlinear coefficient of the nonlinear optical waveguide.

12. The light source apparatus according to claim 1, wherein the shaping unit includes:

a divider that divides the pump light pulse into a plurality of beams of divided light, a plurality of waveguide units that each guide the corresponding one of the plurality of beams of divided light that have been divided, the plurality of waveguide units having different optical path lengths, and a combiner that combines the plurality of beams of divided light from the plurality of waveguide units.

13. The light source apparatus according to claim 1, wherein the shaping unit includes a spatial light phase modulator.

14. The light source apparatus according to claim 1, wherein the shaping unit includes a fiber Bragg grating.

15. The light source apparatus according to claim 1, the shaping unit includes an optical waveguide that have at least two tapered portions that have been processed into a tapered shape.

16. An information acquisition apparatus, comprising: a light source apparatus according to claim 1, an output of the light source apparatus being used as a light source that is used by the information acquisition apparatus to acquire information.

17. The light source apparatus according to claim 1, wherein a pulse width of the pump pulse is 10 ps or less.

18. A light source apparatus comprising:

an introduction unit that introduces a pump light pulse having a first wavelength;

a shaping unit that shapes a waveform of the pump light pulse; and a nonlinear optical waveguide that generates a wavelength converted light pulse from the pump light pulse through an optical parametric process, the pump light pulse being a pulse that has been shaped in the shaping unit, the wavelength converted light pulse including a second wavelength different from the first wavelength, wherein the shaping unit shapes the waveform of the pump light pulse such that an absolute value of a time rate of change of the waveform at a peak of the pump light pulse that has been shaped is smaller than an absolute value of a time rate of change of the waveform at a peak of the pump light pulse before being shaped with the shaping unit, and wherein in a period in which the waveform of the wavelength converted light pulse and the waveform of the pump light pulse do not overlap each other, the shaping unit shapes the pump light pulse such that an intensity of the pump light pulse that has been shaped is smaller than an intensity of the pump light pulse before being shaped.

19. A light source apparatus comprising:

an introduction unit that introduces a pump light pulse having a first wavelength;

a shaping unit that shapes a waveform of the pump light pulse; and a nonlinear optical waveguide that generates a wavelength converted light pulse from the pump light pulse through an optical parametric process, the pump light pulse being a pulse that has been shaped in the shaping unit, the wavelength converted light pulse including a second wavelength different from the first wavelength, wherein the shaping unit shapes the waveform of the pump light pulse such that an absolute value of a time rate of change of the waveform at a peak of the pump light pulse that has been shaped is smaller than an absolute value of a time rate of change of the waveform at a peak of the pump light pulse before being shaped with the shaping unit, and wherein the pump light pulse satisfies $$\Delta t_r + t_{wo} \le \Delta t_p,$$

where $\Delta t_p$ is a pulse width of the pump light pulse, $\Delta t_r$ is the pulse width of the wavelength converted light pulse, and $t_{wo}$ is a walk-off time of the wavelength converted light pulse with respect to the pump light pulse in the nonlinear optical waveguide.

* * * * *